(12) United States Patent
Keiser et al.

(10) Patent No.: US 8,025,726 B1
(45) Date of Patent: Sep. 27, 2011

(54) SULFUR CONTAINING SILICA PARTICLE

(75) Inventors: Bruce A. Keiser, Plainfield, IL (US); Nicholas S. Ergang, Glen Ellyn, IL (US); Richard Mimna, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 12/756,577

(22) Filed: Apr. 8, 2010

(51) Int. Cl.
*C01B 33/00* (2006.01)
*C01B 33/113* (2006.01)
*C09D 1/00* (2006.01)

(52) U.S. Cl. ........ 106/482; 106/401; 106/403; 106/404; 106/419; 106/436; 106/442; 106/452; 106/457; 106/461; 106/480; 106/483; 106/484; 106/286.1; 106/287.1; 106/287.32; 423/326; 423/327.1; 423/331

(58) Field of Classification Search .......... 106/401, 106/403, 404, 419, 436, 442, 452, 457, 461, 106/480, 481, 482, 483, 484, 286.1, 287.1, 106/287.32; 423/326, 327.1, 331
See application file for complete search history.

(56) References Cited

U.S. PATENT DOCUMENTS

| | | | | |
|---|---|---|---|---|
| 5,164,095 | A * | 11/1992 | Sparapany et al. | 210/735 |
| 5,346,627 | A * | 9/1994 | Siefert et al. | 210/729 |
| 6,326,326 | B1 | 12/2001 | Feng et al. | |
| 6,723,426 | B2 | 4/2004 | Fryxell et al. | |
| 6,749,825 | B2 | 6/2004 | Fryxell et al. | |
| 7,250,148 | B2 | 7/2007 | Yang et al. | |
| 7,550,060 | B2 * | 6/2009 | Jacobson et al. | 162/158 |
| 7,553,547 | B2 | 6/2009 | Fryxell et al. | |
| 7,588,798 | B2 | 9/2009 | Alford et al. | |
| 2006/0086834 | A1 | 4/2006 | Pfeffer et al. | |
| 2007/0026531 | A1 | 2/2007 | Mattigod et al. | |
| 2007/0053846 | A1 | 3/2007 | Dave et al. | |

FOREIGN PATENT DOCUMENTS

| | | |
|---|---|---|
| WO | WO 98/34723 | 8/1998 |
| WO | WO 00/56450 | 9/2000 |

OTHER PUBLICATIONS

"Environmental Application of Mineral Sulfides for Removal of Gas-Phase Hg(0) and Aqueous $HG^{2+}$", P.J. Martellaro, G.A. Moore, E.S. Peterson, E.H. Abbott, A.E. Gorenbain, Separation Science and Technology, 36(5 & 6), pp. 1183-1196, 2001.
"Nanoscale metal sulfides for mercury sorption" (abstract only), E.S. Peterson, P.J. Martellaro, G. A. Moore, Abstracts of Papers, $235^{th}$ ACS National Meeting, New Orleans, LA, Apr. 6-10, 2008.
"Mercury-sorption characteristics of nanoscale metal sulfides" (abstract only), G.A. Moore, P.J. Martellaro, E.S. Peterson, Studies in Surface Science and Catalysis (2000), 129(Nanoporous Materials II, Proceedings of the Conference on Access in Nanoporous Materials, 2000), pp. 765-772.

* cited by examiner

*Primary Examiner* — Anthony J Green
(74) *Attorney, Agent, or Firm* — Edward O. Yonter; Michael B. Martin

(57) ABSTRACT

A silica containing composition is disclosed. The composition comprises a compound having the following formula: $(SiO_2)_x(OH)_yM_zS_aF$: wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

10 Claims, No Drawings

US 8,025,726 B1

SULFUR CONTAINING SILICA PARTICLE

FIELD OF THE INVENTION

This disclosure pertains to a silica-containing composition, specifically a silica-containing composition that includes a sulfur moiety.

BACKGROUND OF THE INVENTION

Silica-containing materials have ubiquitous applications. More specifically, a variety of manufacturing processes that produce either consumer or industrial products utilize silica-containing materials for various purposes. For example, silica-containing products can be utilized as fillers in coatings (e.g. paints) and polymer composites, catalysts supports, beer/wine/juice clarifiers. New and improved silica containing products with increased performance and ease of use are desired by various industries.

SUMMARY OF THE INVENTION

A. Compositions

The present invention provides for a composition comprising a compound having the following formula $(SiO_2)_x(OH)_yM_zS_aF$: wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

The present invention also provides for a composition comprising a compound having a formula of $(SiO_2)_{15}.Cu_1S_5$.

B. Product by Process

The present invention further provides for a product produced by filtering an aqueous-based material from a composition comprising a compound having the following formula $(SiO_2)_x(OH)_yM_zS_aF$ wherein M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; wherein the molar ratio of y/x is equal to 0.01-0.5, the molar ratio of x/z is equal to 3-300, and the molar ratio of a/z is 1-5; and wherein the compound comprises 3% to 15% by weight in an aqueous-based slurry.

The present invention also provides for a product produced from drying a composition at a temperature of 100° C. to 350° C., wherein said composition comprises a compound containing the following formula $(SiO_2)_x(OH)_yM_zS_aF$: wherein M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

C. Methods of Manufacture

The present invention provides for a method of forming a silica-containing product/composition comprising: a. providing a silica containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica-containing product.

The present invention also provides for a method of forming a silica-containing product/composition comprising: a. providing a silica containing precursor (SCP) contained in solution that has a pH greater than 7; b. adjusting the pH of the solution to less than or equal to 7; c. optionally doping the SCP with one or more metal species, wherein said doping occurs when the solution has a pH less than or equal to a pH of 7; d. adjusting the pH of the solution to greater than 7; e. adding an effective amount of salt to the solution so that the conductivity of the solution is greater than or equal to 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: a functionalized metal oxide-doped or metal sulfide-doped silica-containing product.

DETAILED DESCRIPTION OF THE INVENTION

Any patents and published applications mentioned in this application are herein incorporated by reference.

As specified above, the present invention provides a composition that contains a compound with a sulfur component, specifically a compound having a formula of $(SiO_2)_x(OH)_yM_zS_aF$: wherein M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, and polymer-based dithiocarbamates, polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

The compound can be in various forms and proportions relative to the components of the compositions. In addition, various products can contain the compounds encompassed by this invention. For example, the following compound embodiments can stand alone, be further modified by chemical and/or physical means, or integrated into other products, e.g. consumer or industrial products.

In another embodiment, the invention also provides for a composition comprising a compound having a formula of: $(SiO_2)_{15} \cdot Cu_1 S_5$.

In another embodiment, the compound comprises 3% to 15% by weight in an aqueous-based slurry.

In another embodiment, the compound comprises 15% to 40% by weight in a wet cake form.

In another embodiment, the compound comprises 40% to 99% by weight in a powder form.

In another embodiment, the compound has a particle size of 5 to 200 μm containing aggregated nanoparticles ranging from 3 to 500 nm.

In another embodiment, the compound has a surface area of 30 m2/g to 800 m2/g.

In another embodiment, the compound has a pore volume of 0.3 cc/g to 2.0 cc/g.

In another embodiment, a product is produced by filtering an aqueous-based material from a composition comprising a compound having the following formula $(SiO_2)_x(OH)_y M_z S_a F$ wherein M is selected from at least one of the following: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; wherein the molar ratio of y/x is equal to 0.01-0.5, the molar ratio of x/z is equal to 3-300, and the molar ratio of a/z is 1-5; and wherein the compound comprises 3% to 15% by weight in an aqueous-based slurry.

In another embodiment, the product is produced from drying a composition at a temperature of 100° C. to 350° C., wherein said composition comprises a compound having the following formula $(SiO_2)_x(OH)_y M_z S_a F$: wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

The compounds can be made in various ways, such as US Patent Publication No. 2007/0231249, which is herein incorporated by reference.

As stated above, the silica-containing products encompassed by this invention can be made by the following methods.

One methodology involves starting from an acidic starting point.

In one embodiment, the method comprises forming a silica-containing product comprising the steps of: a. providing a silica containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica-containing product.

In another embodiment, the functional group in step f is an organosilane.

In another embodiment, the silicon-containing precursor is selected from at least one of the following: silicic acid, colloidal silica, tetraethylorthosilicate, and dispersed fumed silica.

In another embodiment, the pH range of the SCP in step 1(a) is from 3 to 4.

In another embodiment, the pH of the SCP is adjusted to greater than 7 by mixing/interacting the molecules of said SCP with an alkaline solution at a shear rate of 6 to 23 m/s based on tip speed.

In another embodiment, the method further comprises adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than 7 by combining said SCP with an alkaline solution with mixing yielding a Reynolds Number greater than or equal to 2000, to form the silica-containing product.

In another embodiment, the method further comprises adjusting the pH of the SCP to greater than 7 by combining said SCP with an alkaline solution under transitional flow conditions, i.e. Reynolds Numbers between 2000 and 4000, to form the silica-containing product.

In another embodiment, the method further comprises adjusting the pH of the SCP to greater than 7 by combining said SCP with an alkaline solution under turbulent flow conditions, i.e. Reynolds Numbers greater than or equal to 4000, to form the silica-containing product.

In another embodiment, the pH of the SCP is adjusted to a pH range of 7 to 11 with the use of a chemistry selected from at least one of the following: ammonium hydroxide, ammonium carbonate, mineral bases such as but not limited to sodium hydroxide and/or potassium hydroxide, organic bases such as but not limited to trimethylammonium hydroxide, alkaline silicates, sulfide salts such as but not limited to sodium sulfide, and polysulfide containing salts such as but not limited to calcium polysulfide and/or sodium polysulfide.

In another embodiment, the resulting slurry from step d is filtered and dried such that the solid concentration of said dried and filtered product is increased from about 5 wt % to about 99 wt %.

In another embodiment, the dried product from step e is surface treated with an organosilane via controlled hydrolysis and condensation of the silane to the silica surface in at least one of the processes: an organic solvent, supercritical solvent, or solvent-free process.

Another methodology involves starting from an alkaline starting point.

In one embodiment, the method comprises forming a silica-containing product comprising the steps of: a. providing a silica containing precursor (SCP) contained in solution that has a pH greater than 7; b. adjusting the pH of the solution to less than or equal to 7; c. optionally doping the SCP with one or more metal species, wherein said doping occurs when the solution has a pH less than or equal to a pH of 7; d. adjusting the pH of the solution to greater than 7; e. adding an effective amount of salt to the solution so that the conductivity of the solution is greater than or equal to 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: functionalized metal oxide-doped or metal sulfide-doped silica-containing product.

In another embodiment, the functional group in step g is an organosilane.

In another embodiment, the silicon-containing precursor is selected from at least one of the following: silicic acid, colloidal silica, alkaline silicates, tetraethylorthosilicate, and dispersed fumed silica.

In another embodiment, the pH of the silicon-containing precursor is adjusted through the use of at least one of the following: carbonic acid, an organic acid(s) such as but not limited to acetic acid, a mineral acid(s) such as but not limited to sulfuric acid and/or hydrochloric acid such that the pH is decreased to a range of from to 2 to 7.

In another embodiment, the pH range of the SCP is adjusted to a range of 3 to 4 with acetic acid.

In another embodiment, the pH of the SCP is adjusted to a pH range of 7 to 11 with the use of a chemistry selected from at least one of the following: ammonium hydroxide, ammonium carbonate, mineral bases, organic bases, alkaline salts, sulfide salts, alkaline silicates, and polysulfide containing salts.

In another embodiment, the resulting slurry from step e is filtered and dried such that the solid concentration of said dried and filtered product is increased from about 5 wt % to about 99 wt %.

In another embodiment, the dried product from step f is surface treated with an organosilane via controlled hydrolysis and condensation of the silane to the surface of the SCP in at least one of the following: an organic solvent, supercritical solvent, or solvent-free process.

In another embodiment, the pH of the SCP is adjusted to greater than 7 by mixing said SCP with an alkaline solution at a shear rate of 6 to 23 m/s based on tip speed.

In another embodiment, the method further comprises adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than 7 by combining said SCP with an alkaline solution with mixing yielding a Reynolds Number greater than or equal to 2000, to form the silica-containing product.

In another embodiment, the method further comprises adjusting the pH of the SCP to greater than 7 by combining said SCP with an alkaline solution under transitional flow conditions, i.e. Reynolds Numbers between 2000 and 4000, to form the silica-containing product.

In another embodiment, the method further comprises adjusting the pH of the SCP to greater than 7 by combining said SCP with an alkaline solution under turbulent flow conditions, i.e. Reynolds Numbers greater than or equal to 4000, to form the silica-containing product. The sulfur-based species of the present invention may be selected from a representative list but not intended to be a limiting list of at least one of the following: sulfide salts, dithiocarbamates, polymer-based dithiocarbamates, and polysulfide salts. Sulfide salts maybe but not limited to sodium sulfide, potassium sulfide, and/or metal sulfides such as copper sulfide. Dithiocarbamates may be but not limited to dimethyldithiocarbamate (DMDTC) or diethyldithiocarbamate (DEDTC). Polymer-based dithiocarbamates contain organic polymers containing the functional group $R_nCS_2$. wherein R is an alkyl group which is linear or branched. An example of a commercially available polymer-based dithiocarbamate is described in U.S. Pat. No. 5,164,095 and U.S. Pat. No. 5,346,627, which are herein incorporated by reference. Polysulfides that can be used in the present invention include, but are not limited to, sodium polysulfide and calcium polysulfide.

Organosilanes that can be used in the current invention are well known in the art and may be represented generally by $R_{(4-a)}$—$SiX_a$, wherein a may be from 1 to 3. The organofunctional group, R—, may be any aliphatic or alkene containing functionalized group such as propyl, butyl, 3-chloropropyl, amine, thiol, and combinations thereof. X is representative of a hydrolysable alkoxy group, typically methoxy or ethoxy. Some examples are 3-thiopropyl and mercaptopropyl silanes.

During the preparation of the composition of this invention, salt is added to increase the conductivity of the reaction solution to 4 mS. Examples of the salts that can be used include, but are not limited to, alkali and alkaline halides, sulfates, phosphates, and nitrates such as sodium sulfite, potassium chloride, sodium chloride, sodium nitrate, calcium sulfate, and potassium phosphate. One skilled in the art would recognize that the effective amount of salt added to reach the desired conductivity will vary dependent on the salt of choice.

Thiols and amines are represented generally by the class of organic and inorganic compounds containing the amine or thiol group having the general formula —B—(SH) or —B—($NH_2$), wherein B is a linear or branched group consisting of carbon atoms such as —$(CH_2)_n$—, wherein n is from 1 to 15, in particular where n is 1 to 6, and most preferred where n is 3.

EXAMPLES

Example 1

In this example, 2180 g of 7 wt % silicic acid was added to a heel containing 450 g deionized (DI) water and 150 g of silicic acid heated to 90° C. The silicic acid was fed at 10 ml/min for 3 h via a peristaltic pump into a 5 L reaction flask. A solution containing 16.4 g of a 25 wt % ammonia solution and 5.84 g ammonium carbonate was prepared in 24.6 g DI water. The solution was added to the reaction flask quickly whereupon the viscosity of the solution increased significantly. The mixture was stirred for 30 minutes, then any remaining silicic acid was fed at 20 ml/min. Upon completion of the silicic acid feed, the heating was turned off and the solution was allowed to cool.

The silica slurry was filtered and freeze-dried at 150° C. to produce a dry powder. Nitrogen sorption analysis of the powder was performed on an Autosorb-1C unit from Quantachrome. The sample was degassed at 300° C. for 2 h, then characterized by a multi-point BET (Brunauer, Emmett, and Teller—a surface area test) surface area, total pore volume, and BJH (Barrett-Joyner-Halenda) adsorption pore size distribution. Physical data indicated a surface area of 354 square meters per gram, a pore volume of 1.19 cc/g, and a pore diameter of 13.5 nm.

Example 2

In this example, 1414 g of 8.3 wt % silicic acid was added to a heel containing 16.3 g copper sulfate, 400 g DI water, and 200 g silicic acid heated to 90° C. The silicic acid was fed at 8 ml/min for 3 h via a peristaltic pump into a 5 L reaction flask.

A solution containing 17.3 g sodium sulfide and 11.8 g of a 25 wt % ammonia was prepared in 200 g DI water. The solution was quickly added to the reaction flask after 3 h of silicic acid feed where the viscosity of the solution increased significantly. The mixture was stirred for 30 minutes, then any remaining silicic acid was fed at 16 ml/min. Upon completion of the silicic acid feed, the heating was turned off and the solution was allowed to cool.

The CuS-doped silica slurry was filtered and dried at 105° C. to produce a dry powder. Nitrogen sorption analysis of the powder was performed on an Autosorb-1C unit from Quantachrome. The sample was degassed at 105° C. for 4 h, then characterized by a multi-point BET surface area, total pore volume, and BJH adsorption pore size distribution. Nitrogen sorption analysis indicated a surface area of 321 square meters per gram, a pore volume of 1.46 cc/g, and a pore diameter of 18.2 nm.

Example 3

In this example, three solutions were prepared: A) 12 kg Nalco N8691 silica sol, B) 396 g copper sulfate and 360 g glacial acetic acid dissolved in 5.24 kg DI water, and C) 1.1 kg calcium polysulfide solution and 900 g 25 wt % ammonia dissolved in 16 kg DI water. Solution B was added to solution A, followed by subsequent addition of solution C at a high shear rate. The mixture was stirred for 1-2 minutes before filtration. Nalco N8691 can be obtained from Nalco Company, 1601 West Diehl Road, Naperville, Ill. 60563.

The CuS-doped silica slurry was filtered and flash-dried at 565° F. to produce a dry powder. Nitrogen sorption analysis of the powder was performed on an Autosorb-1C unit from Quantachrome. The sample was degassed at 105° C. for 4 h, then characterized by a multi-point BET surface area, total pore volume, and BJH adsorption pore size distribution. Nitrogen sorption analysis indicated a surface area of 227 square meters per gram, a pore volume of 0.45 cc/g, and a pore diameter of 7.9 nm.

Example 4

In this example, three solutions are prepared: A) 2 kg Nalco N8691 silica sol, B) 53.2 g ferric sulfate and 60 g glacial acetic acid dissolved in 887 g DI water, and C) 184 g calcium polysulfide solution and 150 g 25 wt % ammonia dissolved in 2667 g DI water. Solution B is added to solution A, followed by subsequent addition of solution C at a high shear rate. The mixture is stirred for 1-2 minutes before filtration. The iron sulfide-doped silica slurry is then filtered and flash-dried at 565° F. to produce a dry powder.

COMBINATIONS OF COMPONENTS DESCRIBED IN PATENT APPLICATION

In one embodiment, the composition of matter claims include various combinations of sorbent components and associated compositions, such molar ratios of constituent particles. In a further embodiment, the claimed compositions include combinations of the dependent claims. In a further embodiment, a range or equivalent thereof of a particular component shall include the individual component(s) within the range or ranges within the range.

In another embodiment, the method of use claims include various combinations of the sorbent components and associated compositions, such molar ratios of constituent particles. In a further embodiment, the claimed methods of use include combinations of the dependent claims. In a further embodiment, a range or equivalent thereof of a particular component shall include the individual component(s) within the range or ranges within the range.

In another embodiment, the method of manufacture claims include various combinations of the sorbent components and associated compositions, such pH control. In a further embodiment, the claimed methods of use include combinations of the dependent claims. In a further embodiment, a range or equivalent thereof of a particular component shall include the individual component(s) within the range or ranges within the range.

What is claimed is:

1. A composition comprising a compound having the following formula:

$(SiO_2)_x(OH)_yM_zS_aF$:

wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth;
wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

2. A composition comprising a compound having the following formula: $(SiO_2)_{15}\cdot Cu_1S_5$, wherein S is a sulfur-based species selected from at least one of the following: sulfur, sulfide salts, dithiocarbamates, polymer-based dithiocarbamates, and polysulfide salts.

3. The composition of claim 1, further comprising an aqueous-based slurry wherein the compound comprises 3% to 15% by weight in the aqueous-based slurry.

4. The composition of claim 1, further comprising a wet cake form wherein the compound comprises 15% to 40% by weight in the wet cake form.

5. The composition of claim 1, further comprising a powder form wherein the compound comprises 40% to 99% by weight in the powder form.

6. The composition of claim 4, wherein the compound has a particle size of 5 to 200 μm containing aggregated nanoparticles ranging from 3 to 500 nm.

7. The composition of claim 4, wherein the compound has a surface area of 30 $m^2/g$ to 800 $m^2/g$.

8. The composition of claim 4, wherein the compound has a pore volume of 0.3 cc/g to 2.0 cc/g.

9. A product produced by filtering an aqueous-based material from a composition comprising a compound containing the following formula $(SiO_2)_x(OH)_yM_zS_aF$ in the aqueous-based material: wherein M is at least one of the following metal cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; wherein the molar ratio of y/x is equal to 0.01-0.5, the molar ratio of x/z is equal to 3-300, and the molar ratio of a/z is 1-5; and wherein the compound comprises 3% to 15% by weight in the aqueous-based material.

10. A product produced from drying a composition at a temperature of 100° C. to 350° C., wherein said composition comprises a compound containing the following formula $(SiO_2)_x(OH)_yM_zS_aF$ in an aqueous medium: wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth;

wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 3-300, and the molar ratio of a/z is 1-5.

* * * * *